Feb. 13, 1968 R. P. PAPENGUTH 3,368,821
JOURNAL BOX SEALING DEVICE
Filed Feb. 15, 1965 2 Sheets-Sheet 1

INVENTOR.
RICHARD P. PAPENGUTH
BY John N. Wolfram
ATTORNEY

Feb. 13, 1968   R. P. PAPENGUTH   3,368,821
JOURNAL BOX SEALING DEVICE
Filed Feb. 15, 1965   2 Sheets-Sheet 2

INVENTOR.
RICHARD P. PAPENGUTH
BY John N. Wolfram
ATTORNEY

United States Patent Office 3,368,821
Patented Feb. 13, 1968

3,368,821
JOURNAL BOX SEALING DEVICE
Richard Palen Papenguth, Manhattan Beach, Calif., assignor to Parker-Hannifin Corporation, Cleveland, Ohio, a corporation of Ohio
Filed Feb. 15, 1965, Ser. No. 432,592
1 Claim. (Cl. 277—130)

ABSTRACT OF THE DISCLOSURE

A sealing device for a railroad journal box, the device comprising a resilient member attached to a rigid plate and having a cylindrical extension and a radial flange, a part of the flange being deflected to tubular shape upon insertion of the axle and the inner diameter of the resilient member being tapered to provide a clearance with the flange so that the cylindrical extension has its thinnest section near the plate and its thickest section adjacent the flange.

---

Figure 1:
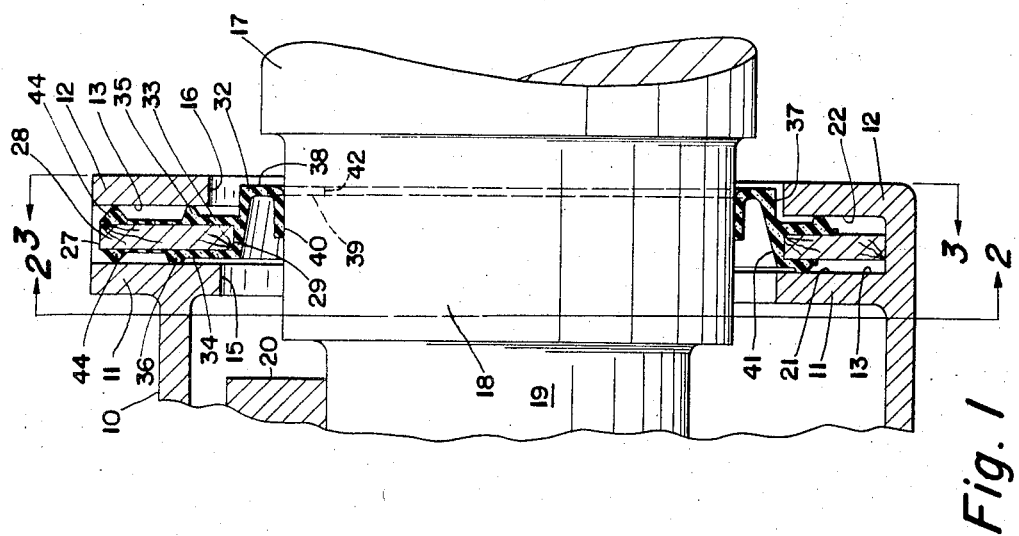

Journal boxes for railway cars house bearings for the car axles and contain lubricant for lubricating the bearings. The journal boxes have an opening through which the axle extends and there is a slot surrounding the opening for receiving a sealing device engageable with the axle and surfaces of the slot for preventing access of dust and other foreign matter to the interior of the journal box and to prevent leakage of lubricant therefrom. It is particularly difficult for the sealing device to at all times maintain sealing contact with the axle and slot surface because the axle moves a considerable extent in both axial and sideward directions relative to the journal box opening. Such movement not only makes it difficult to maintain a seal but also causes rapid wear and early breakdown of the sealing device.

It is an object of the present invention to provide a journal box sealing device that will readily accommodate relative movement between the axle and journal box in all directions.

It is another object to provide a sealing device of the type described in which there is a means for loosely retaining the sealing device within the journal box slot in its approximate position of use when the axle is not in place but that is yieldable to permit ready insertion and removal of the sealing device from the slot.

It is another object to provide a journal box sealing device that comprises a molded element of resilient material for making sealing contact with both the shaft and journal box and a support member of economical material, the resilient material being of thin section throughout for maximum economy.

It is another object to provide a journal box sealing device that includes a sealing member of stretchable resilient material having closed gas-containing cells, the walls between the cells being sufficiently thin that the material does not behave as a solid mass, particularly after it has been stretched into its position of use, and also that a small percentage of the walls become perforated during molding whereby some of the cells are open to the sealing surface of the member for absorbing lubricating oil. At the same time, the walls are not so thin that so many become apertured as to permit leakage through the member.

It is another object to provide the sealing member with a sufficient volume of cells so as to permit stretching of an annular portion thereof as much as 30% without creating so much hoop tension therein that it will grip a rotary part over which it is stretched to such an extent that excessive heat of friction will be developed, while at the same time there is enough hoop tension to assure sealing contact solely through said hoop tension, thus making mechanical aids, such as garter springs, unnecessary.

Figure 2:
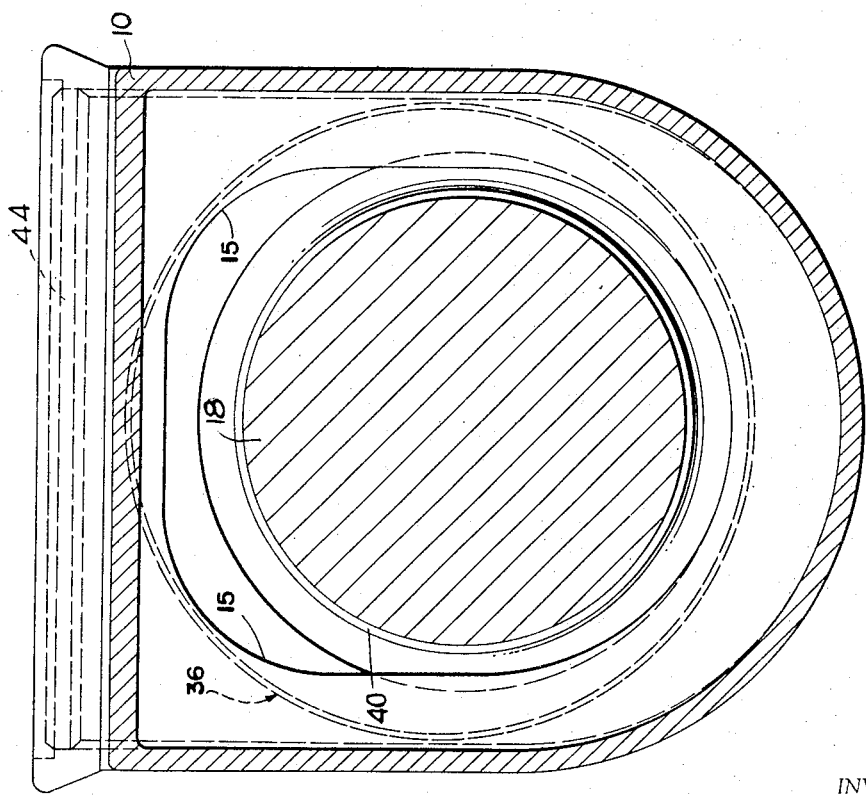
Figure 3:
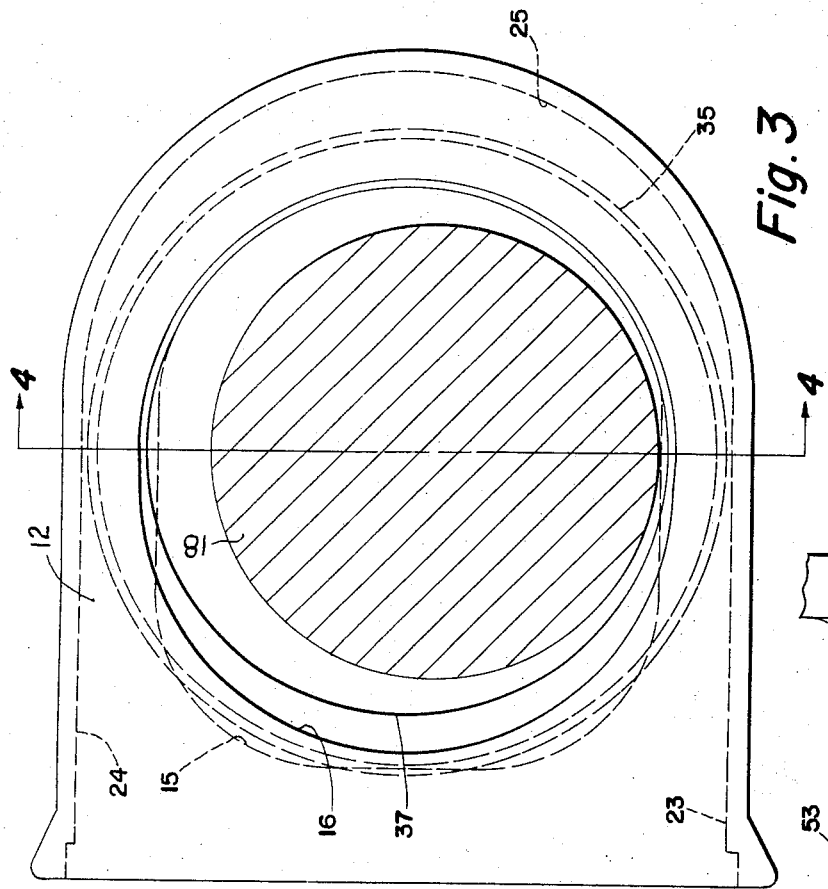
Figure 4:
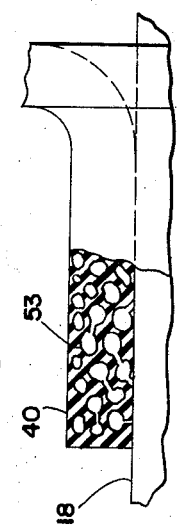
Figure 4:
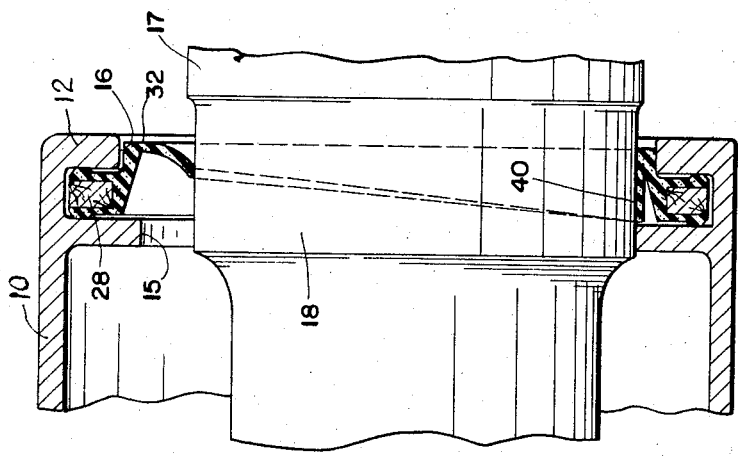

Other objects of the invention will be apparent from the following description and from the drawing in which:

FIGURE 1 is a side view of a journal box, partly in section and showing the sealing device in cross section in sealing position against the axle, FIGURE 2 is an end view along the lines 2—2 of FIGURE 1, FIGURE 3 is an end view along the lines 3—3 of FIGURE 1 but with the axle shifted sidewards in the journal box, FIGURE 4 is a fragmentary cross section along the lines 4—4 of FIGURE 3, and FIGURE 5 is an enlarged fragmentary section view of a portion of the sealing device in contact with the axle and showing the gas-filled cells of the seal material in exaggerated size.

Journal box 10 is of conventional form and at its inner end has first and second vertical walls 11 and 12 that are spaced apart to form a vertical slot 13 therebetween. Walls 11 and 12 have openings 15, 16 through which car axle 17 extends, these openings having end view configurations as shown in FIGURES 2 and 3, respectively. The axle has a reduced cylindrical surface 18 where it passes through openings 15, 16 and has a further reduced cylindrical portion 19 that is journaled in bearing member 20. As shown in FIGURES 1 and 3, slot 13 has flat end wall surfaces 21, 22 and straight side wall surfaces 23, 24, is closed at the bottom by a curved surface 25 and is open at the top.

Mounted within slot 13 is a sealing device generally designated 27 which includes a flat plate 28 of plywood or other economical material having a central circular opening 29 therein.

Attached to the inner margin of plywood plate 28 by either molding in place by bonding is sealing member 32 of rubber-like material having distributed substantially uniformly throughout its extent a myriad of closed gas-filled cells. Such material is frequently referred to as foam or unicellular rubber.

Plate 28 is preferably made of plywood or some other economical material. However, it may be of homogeneous rubber or even of unicellular rubber the same as sealing member 32. In the latter case, the entire sealing device 27 is of one piece construction.

Member 32 has a pair of thin annular disc-like portions 33, 34 with annular ribs 35, 36 at the outer margins thereof. Ribs 35 and 36 have the same diameter but the center of rib 36 is upwardly of that of rib 35 whereby ribs 35, 36 are staggered at their upper and lower portions, as indicated in FIGURE 1. Staggering of the ribs in this manner permits them to be circular and of equal diameter and yet seal the respective non-circular openings 15, 16. Ribs 35, 36 are of a height such that they will be compressed when seal element 27 is within slot 13 so as to engage in sealing contact with wall surfaces 21, 22 of slot 13.

Sealing member 32 has a cylindrical extension 37 that enters opening 16 and is a loose fit therein. Projecting radially inwardly from the end of cylindrical extension 37 is a thin flange 38. This flange is initially in the form of a flat annular disc, as indicated by the dotted lines in FIGURE 1, but when in use its inner portion 39 is stretched and deflected by axle portion 18 into a tubular shaped lip 40, as shown by the solid line in FIGURE 1. Opening 29 in plywood plate 28 is of slightly larger diameter than cylindrical extension 37 and the latter is of thin cross section whereby it may readily bend radially inwardly so that it will pass through slot 13 when sealing device 27 is being inserted or removed from the journal box slot. The thickest portion of the cylindrical extension is adjacent flange 32 to provide maximum support for flange 32. Radially inner surface 41 of sealing member 32 is tapered at an angle of approximately 15° with the longitudinal axis to facilitate obtaining of a thin cross section at this portion of member 32, which thin portion not only permits ready bending of cylindrical extension 37 as described but also helps to reduce the volume and hence the expense of member 32. Also, such taper gives assurance that the free end of lip 40 will remain out of contact with the radially opposed portion of the resilient member when the axle is radially deflected, as seen in the lower portion of FIG. 4.

Located at the upper edge of plywood plate 28 and encircling the same is a rib 44 of unicellular resilient material either molded into place on plate 28 or bonded thereto in a separate operation. Rib 44 makes sealing contact with all the upper wall surfaces of slot 13 for completely sealing the upper open end of slot 13 against entrance of dust and other foreign matter.

Standard railway journal boxes as herein described permit substantial sideward and axial movement of the axle therein. When the axle moves sideward, as illustrated in FIGURE 4, the tubular lip 40 must follow so as to maintain sealing contact therewith all the way around the axle. To accomplish this, the tubular lip must have substantial length in its position on the axle when the latter is centered in the journal box. Consequently, this requires that the initial inner diameter 42 of flange 38 be substantially smaller than the diameter of axle surface 18, as shown in FIGURE 1. This in turn requires material of flange inner portion 39 to stretch a considerable amount when the axle is inserted.

It has been found that the initial size of the closed cells 53 in inner flange portion 39 and the total volume of the cells as compared with the total volume of the flange, is of great importance. When the cells and their total volume are initially too small, the walls between the cells are relatively thick. Upon stretching of the flange over the axle, the cells further reduce in size and the material in the lip behaves in the manner of a homogeneous resilient material having no gas-filled cells. As such, there is a considerable hoop tension in the lip so that it engages the axle so tightly and with so much friction that considerable heat is generated in the lip as the axle rotates. This problem is further complicated by the fact that the heat induced in the lip produces the Joule effect under which rubber shrinks when subjected to heat while under stress. Such shrinkage further increases the tension of lip 40 upon the axle which causes more friction and further temperature increase. The result is early failure of lip 40.

When the cells 53 and/or their total volume are initially too large, the walls between the cells are correspondingly too thin with two detrimental results. One is that too many of the walls become perforated whereby the lip material is porous and permits leakage of fluid therethrough. The other is that the lip stretches too easily and when stretched over the axle does not gain enough hoop tension to establish and maintain sealing contact with the axle.

It has been found that satisfactory wall thickness between cells is obtained when the total volume of the cells is about 40% of the total volume of the sealing member. With this relationship the walls are thin enough and there is sufficient trapped gas in the closed cells so that the material does not behave as a solid mass. There is enough hoop stress in the lip to establish sealing contact with the axle without the assistance of garter springs, but not so much tension that there is excessive friction and heat. The Joule effect is negligible and the lip is long lasting. Also, there are open cells to permit absorption of lubricating oil but not enough to permit leakage through the lip. The lubricating oil may be introduced into the open cells either by soaking the member in oil prior to installation or by contact of the member with oil in the installation.

With the journal box seal as herein described, lip 40 will maintain a seal against axle 17 as the latter rotates despite shifting of the axle in radial and axial directions relative to journal box 10. Ribs 35, 36 maintain sealing contact with walls 22, 21. Likewise, rib 44 maintains sealing contact with walls 21, 22, 23 and 24 of slot 13 to prevent dust and foreign matter from entering the slot from the exterior.

I claim:

1. In combination, a sealing device and a journal box having radially extending opposed walls forming a slot, said slot being open on one end and receiving the sealing device, the journal box also having openings in said opposed walls thereof through which the axle passes, said sealing device having a relatively rigid plate-like portion with an opening through which the axle passes and having a portion of resilient material attached to the rigid portion including a thin resilient disc attached on each side of the plate, a tubular portion within the rigid plate-like portion, and having a cylindrical extension having an end portion attached to an end portion of said tubular portion, said cylindrical extension projecting in one axial direction away from said tubular portion and into one of the journal box openings when said sealing device is in the slot, said cylindrical extension being of gradually increasing thickness with its thinnest section at the end that is attached to the tubular portion and adjacent the rigid plate-like portion whereby the extension is readily bendable at said thinnest section to fit within the slot so as to permit insertion and withdrawal of the device through the slot, and said resilient portion having a flange that extends radially inward from the free end of said extension at a location axially offset from said thinnest section to an inner diameter smaller than that of the axle when the latter is not inserted therethrough, said flange upon insertion of the axle therethrough being stretched and deformed so as to form a tubular lip sealingly engaged with the axle and with the free end of the lip extending axially toward said tubular portion, the thickest portion of the cylindrical extension being radially opposite the flange to provide maximum support for the flange against axially outward deflection.

References Cited

UNITED STATES PATENTS

| | | | |
|---|---|---|---|
| 2,012,974 | 9/1935 | Penniman | 277—152 X |
| 2,151,410 | 3/1939 | Richter | 277—130 X |
| 2,487,669 | 11/1949 | Pattullo et al. | 277—131 |
| 2,668,067 | 2/1954 | Fitzsimmons | 277—130 X |
| 2,692,783 | 10/1954 | Foss | 277—132 |
| 3,069,179 | 12/1962 | Johnson | 277—130 |
| 3,108,813 | 10/1963 | Brown et al. | 277—1 |
| 3,220,786 | 11/1965 | McCutchen | 308—240 |
| 2,348,587 | 5/1944 | Antonelli | 277—152 X |

FOREIGN PATENTS

| | | |
|---|---|---|
| 724,341 | 2/1955 | Great Britain. |

LAVERNE D. GEIGER, *Primary Examiner.*

J. S. MEDNICK, *Assistant Examiner.*